B. S. BOWDISH.
FOOD HOLDING DEVICE FOR BIRDS.
APPLICATION FILED JAN. 30, 1915.
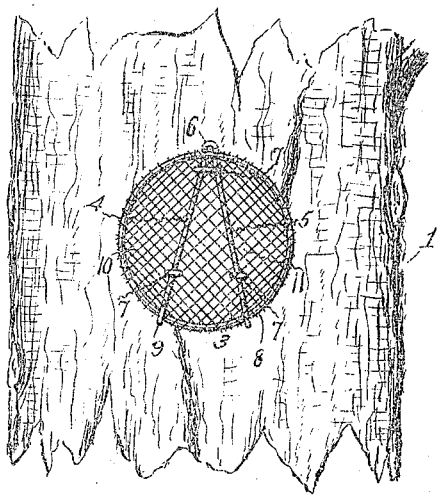
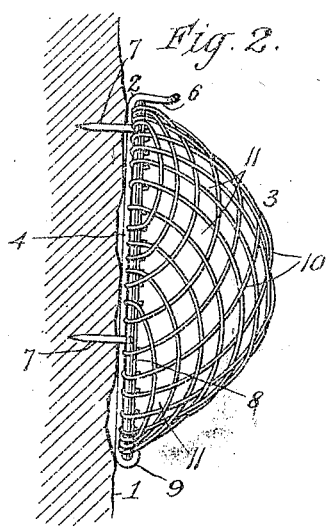
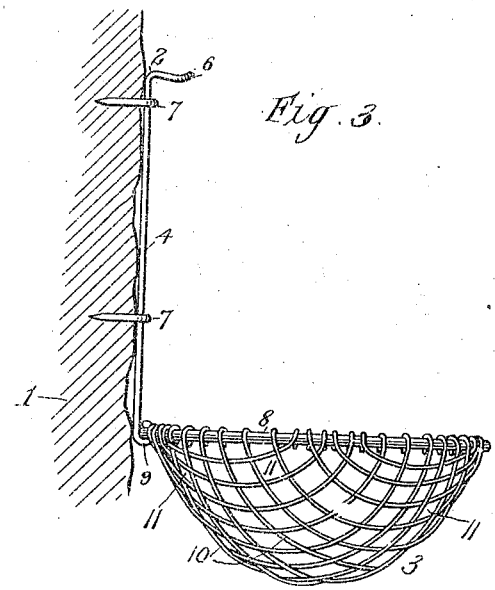

UNITED STATES PATENT OFFICE.

BEECHER S. BOWDISH, OF DEMAREST, NEW JERSEY.

FOOD-HOLDING DEVICE FOR BIRDS.

1,221,019.  Specification of Letters Patent.  Patented Apr. 3, 1917.

Application filed January 30, 1915. Serial No. 5,186.

*To all whom it may concern:*

Be it known that I, BEECHER S. BOWDISH, a citizen of the United States, residing at Demarest, county of Bergen, and State of New Jersey, have invented certain new and useful Improvements in Food-Holding Devices for Birds, fully described and represented in the following specification and the accompanying drawings, forming a part of the same.

This invention relates to certain improvements in food-holding feeding devices for birds.

It is one object of the invention to provide a food-holding device which may be attached to a tree or other suitable support, which can be filled with food without removing the device from its support.

It is a further object of the invention to provide a food-holding device for birds of such configuration that the birds may readily reach the food held in the device until the supply of food in the holder has been entirely consumed.

It is a further object of the invention to provide a food-holding device of simple character, made of few parts so that it can be made very cheap, and which shall be of such design as not to tend to frighten away birds attracted to the food.

With these and other objects not specifically referred to in view, the invention consists in certain parts and constructions, a detailed description of which will be given in connection with the accompanying drawings, in which—

Figure 1 is a front view of the device, shown in closed position and secured to the trunk of a tree;

Fig. 2 is a side view of the device in closed position, the tree trunk being shown in section, and Fig. 3 is a view similar to Fig. 2, the device being shown in open position to have food placed therein.

Referring now to these drawings, the device is shown as secured to the trunk of a tree marked 1. While the device is so shown, it will be understood that it may be attached to any other suitable support located in the open air.

The food-holding device comprises a base or frame 2, and a food-holding member 3. The food-holder is secured to its support by means of the base or frame in any suitable manner. In the particular construction illustrated, the base is of stiff wire and comprises two legs 4, 5, which diverge from each other from the top toward the bottom, the wire being bent at the top to form a hook 6 which acts as a latch for a purpose hereinafter referred to. The base is secured to the support by means of staples 7, three such staples being shown, one at the top, and the other two toward the lower extremity of the legs, the base, by means of these staples thus arranged, being rigidly secured to the tree or other support.

The food-holding member of the device may vary somewhat in form and in material of which it is made. In the best constructions, however, the food-holding member will be semispherical, in the shape of a cup, dish or basket, the rear end of the holder being opened, so that when the holder is in closed position it will lie close against the tree trunk or other support. In the best constructions, furthermore, the holding member will be so attached to the base that it can be moved relatively thereto so that it can be filled without the necessity of removing the device from the tree. While this may be effected in various ways, in the particular construction illustrated the holding member comprises frame member 8, preferably circular in shape and of stiff wire, which is pivotally supported on the legs 4, 5 of the base, the ends of the legs of the base being turned over, as shown at 9, to form bearings in which the wire frame can rock from open to closed position, as shown in Figs. 2 and 3. The food-holding basket is, in the best constructions, made of wires 10 secured to the frame 8, and woven or twisted to leave apertures 11 of suitable size to permit the birds to reach all of the food contained in the holder.

As illustrated in Figs. 2 and 3, the food-holding basket is semispherical in shape. This construction permits ready access to the food as it is used, and when the food supply becomes low the food drops to the bottom of the basket and is readily reached by the birds through the lower apertures between the wires. The holder, after being filled, is preferably held locked in position by any suitable means, the latch or hook 6 being employed for this purpose in the particular construction illustrated, this hook snapping over the wire frame 8, as shown in Fig. 2, and acting to retain the holder securely in position.

The food-holder for birds thus provided by the present invention is very cheap to manufacture, is durable, contains the food supply so that it is at all times readily reached by the birds, and can be filled with a minimum amount of labor. It is, furthermore, comparatively inconspicuous, and has been found in actual practice not to disturb the birds attracted by the food.

While the holder has been described in its preferred form, it will be understood that certain changes and variations may be made in the configuration of the holder and in the materials of which it is composed, without departing from the invention.

What I claim is:

1. A food-holding feeding device, for birds, comprising a wire base having legs adapted to be fastened to a tree or other support, the ends of said legs being turned to form bearings, a wire frame mounted in the bearings so as to swing freely therein, and a holding receptacle formed of wire mesh secured to the frame.

2. A food-holding feeding device for birds, comprising a wire frame having legs adapted to be fastened to a tree or other support, the ends of the legs being turned to form bearings, a wire frame mounted in the bearings, and a holding receptacle formed of wire mesh secured to the frame, the receptacle being formed with a semispherical food-holding portion.

3. A food-holding device for birds, comprising a base made of wire bent to form legs and a latch, the legs being adapted to be fastened to a tree or other support, bearings on the legs, a wire frame mounted in the bearings so as to swing freely therein, and a holding receptacle formed of wire mesh secured to the frame.

4. A food-holding device for birds, comprising a two-part wire structure, one part being in the form of a semi-spherical wire mesh and pivotally secured to the other part, the two parts forming a holder from which all of the contents may be removed without separating the parts.

5. A food-holding device for birds, comprising a two-part wire structure, one part being formed of wire mesh retracted toward the bottom of the other part, the two parts hinged to each other forming a holder from which all of the contents may be removed by the birds without separating the parts.

In testimony whereof, I have hereunto set my hand, in the presence of two subscribing witnesses.

BEECHER S. BOWDISH.

Witnesses:
CHRISTABEL E. BOWDISH,
LEWIS W. ROBINSON.